(12) United States Patent
Watanabe et al.

(10) Patent No.: US 10,472,834 B2
(45) Date of Patent: Nov. 12, 2019

(54) SHEET AND SYSTEM FOR CURING CONCRETE, CONCRETE CURING METHOD, AND METHOD FOR PRODUCING A CONCRETE STRUCTURE

(71) Applicant: 3M INNOVATIVE PROPERTIES COMPANY, St. Paul, MN (US)

(72) Inventors: Norihisa Watanabe, Kanagawa (JP); Tatsunori Ishizuka, Kanagawa (JP); Naoyuki Toriumi, Kanagawa (JP); Hitoshi Morimoto, Kanagawa (JP)

(73) Assignee: 3M Innovative Properties Company, St. Paul, MN (US)

( * ) Notice: Subject to any disclaimer, the term of this patent is extended or adjusted under 35 U.S.C. 154(b) by 294 days.

(21) Appl. No.: 15/314,520

(22) PCT Filed: May 29, 2015

(86) PCT No.: PCT/US2015/033117
§ 371 (c)(1),
(2) Date: Nov. 29, 2016

(87) PCT Pub. No.: WO2015/184225
PCT Pub. Date: Dec. 3, 2015

(65) Prior Publication Data
US 2017/0107728 A1    Apr. 20, 2017

(30) Foreign Application Priority Data
May 30, 2014    (JP) .................................. 2014-113383

(51) Int. Cl.
*E04G 21/24* (2006.01)
*C04B 40/04* (2006.01)

(52) U.S. Cl.
CPC ............ *E04G 21/246* (2013.01); *C04B 40/04* (2013.01)

(58) Field of Classification Search
CPC .............................. E04G 21/246; C04B 40/04
See application file for complete search history.

(56) References Cited

U.S. PATENT DOCUMENTS 2,003,988 A     6/1935 Angier
3,659,077 A *   4/1972 Olson ....................... H05B 3/00
                                                  219/213

(Continued)

FOREIGN PATENT DOCUMENTS

JP        1046816     2/1989
JP      2002-081210   3/2002

(Continued)

OTHER PUBLICATIONS

Extended EP Search Report, EP 15880692.4, dated Sep. 29, 2017, 7 pages.
International Search Report for PCT International Application No. PCT/US2015/033117, dated Aug. 19, 2015, 3 pages.

*Primary Examiner* — Nahida Sultana
(74) *Attorney, Agent, or Firm* — Steven A. Bern

(57) ABSTRACT

To provide a sheet and a system for curing concrete, in which the moisture amount to be used is small and which are able to reduce temporal and local variations in the moisture amount supplied to the concrete surface, a concrete curing method, and a method for producing a concrete structure. There is provided a concrete curing sheet of some embodiments of the present disclosure having a solid structure group on at least a first surface, the solid structure group having grooves defined between adjacent solid structures, and the grooves transporting water using the capillary phenomenon.

5 Claims, 14 Drawing Sheets

(56) References Cited

U.S. PATENT DOCUMENTS

| | | | |
|---|---|---|---|
| 4,485,137 A * | 11/1984 | White | B32B 27/12 428/57 |
| 5,253,957 A * | 10/1993 | Fujikawa | E04G 23/02 264/36.2 |
| 5,780,367 A | 7/1998 | Handwerker | |
| 7,572,525 B2 * | 8/2009 | McDonald | B28B 11/245 428/703 |
| 8,857,130 B1 * | 10/2014 | Newbrough | E04G 21/246 52/741.4 |
| 9,739,068 B2 * | 8/2017 | Richards | E04G 21/246 |
| 2002/0146540 A1 | 10/2002 | Johnston et al. | |
| 2003/0116776 A1 * | 6/2003 | Oppermann | H05K 1/0219 257/100 |
| 2007/0084508 A1 | 4/2007 | Cotter | |
| 2008/0193348 A1 | 8/2008 | Kooriyama et al. | |

FOREIGN PATENT DOCUMENTS

| | | | | |
|---|---|---|---|---|
| JP | 3754284 | 3/2002 | | |
| JP | 2007-277474 | 10/2007 | | |
| JP | 2010-168804 | 8/2010 | | |
| JP | 5091167 | 8/2010 | | |
| JP | 2010-236222 | 10/2010 | | |
| JP | 4580460 | 11/2010 | | |
| JP | 2011-202436 | 10/2011 | | |
| JP | 2011-202454 | 10/2011 | | |
| WO | WO 2002/062568 | 8/2002 | | |
| WO | WO-03014494 A1 * | 2/2003 | ........... | B28B 11/245 |
| WO | WO 2006-127581 | 11/2006 | | |
| WO | WO 2003-014494 | 2/2013 | | |

* cited by examiner

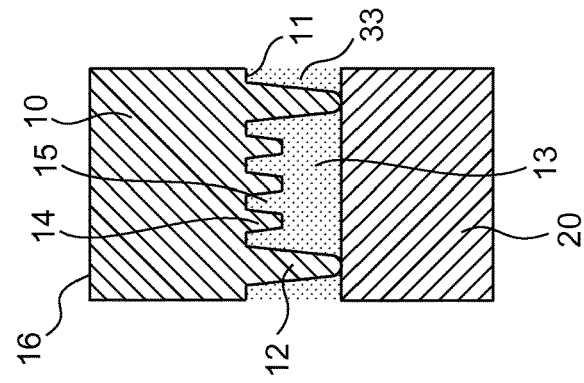
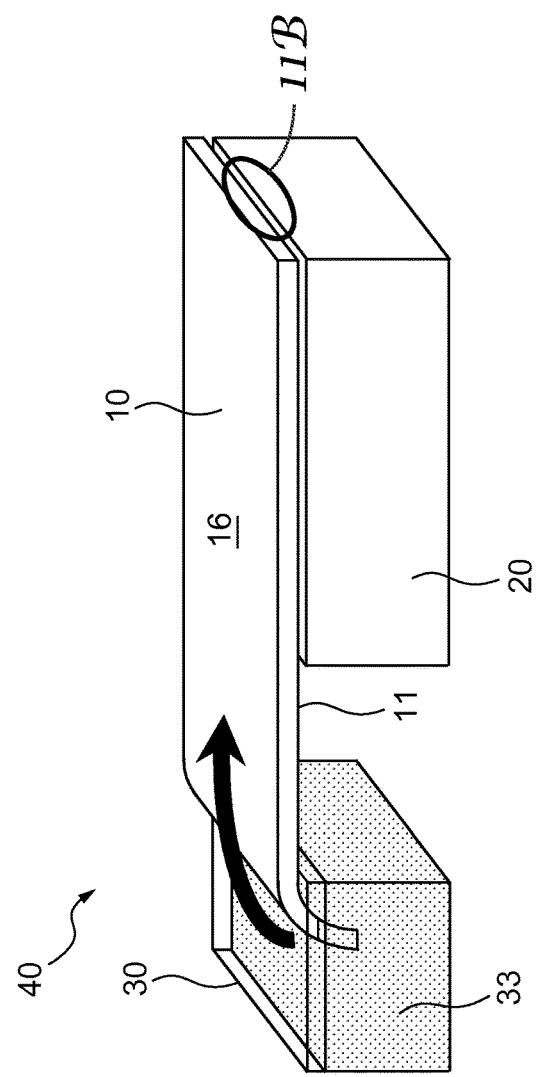
FIG. 11B
FIG. 11A

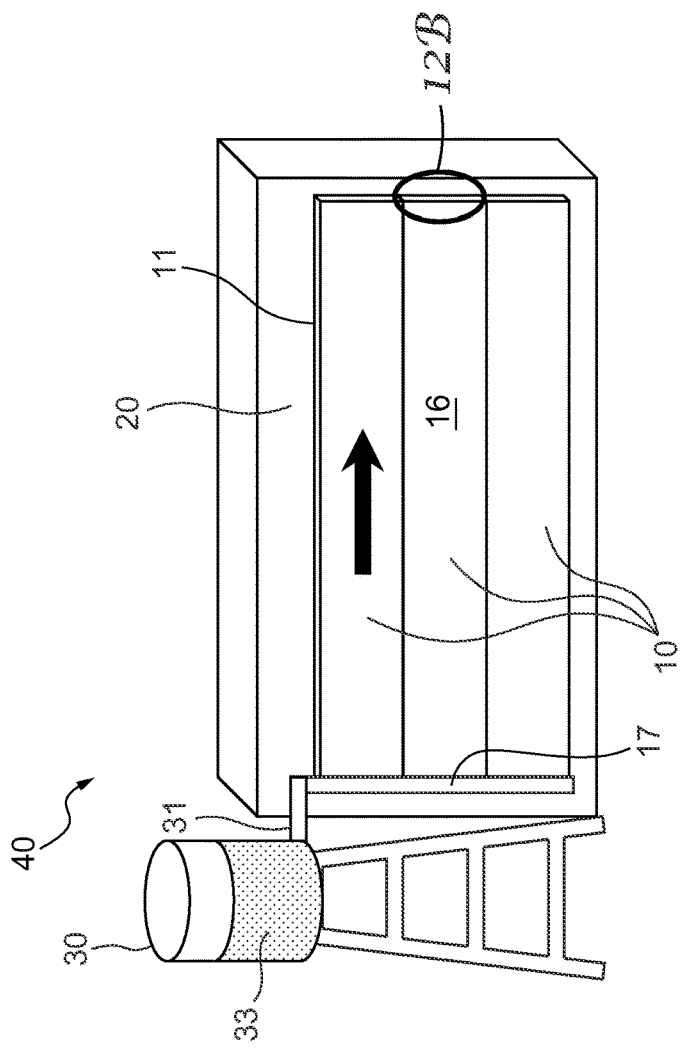
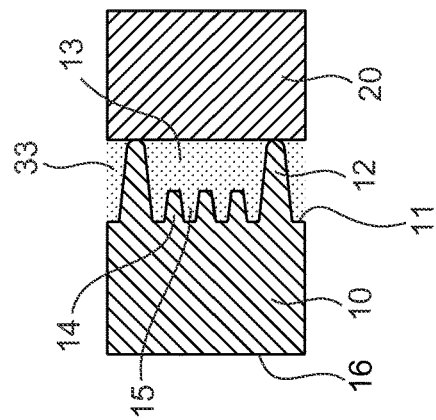
FIG. 12A
FIG. 12B

SHEET AND SYSTEM FOR CURING CONCRETE, CONCRETE CURING METHOD, AND METHOD FOR PRODUCING A CONCRETE STRUCTURE

CROSS REFERENCE TO RELATED APPLICATIONS

This application is a national stage filing under 35 U.S.C. 371 of PCT/US2015/033117, filed May 29, 2015, which claims the benefit of JP Application No. 2014-113383, filed May 30, 2014, the disclosure of which is incorporated by reference in its/their entirety herein.

FIELD OF THE INVENTION

The present disclosure relates to a sheet and system for curing concrete, a concrete curing method, and a method for producing a concrete structure.

BACKGROUND

Poured concrete may be influenced by drying, sudden changes in temperature, or the like during curing, which causes insufficient hydration reaction. When this happens characteristics such as the strength, durability, and appearance of the concrete may be decreased below design values. Therefore, in the curing of concrete, conditions such as the moisture amount, the temperature, and the like of the poured concrete surface are preserved within desired ranges for a desired time.

Such concrete curing methods include methods for reducing the evaporation of moisture from the poured concrete surface, for example, sealed curing and coating curing; methods including supplying water to the poured concrete surface, for example, spray curing and flooding curing; methods including holding a sheet with water absorbing properties facing (in contact with) the poured concrete surface, for example, compression curing; and methods including supplying moisture between the sheet and the concrete surface while holding the sheet facing (in contact with, or close proximity to) the poured concrete surface, for example, water supply curing. These methods are not always clearly distinguishable.

Patent Document 1 (Japanese Unexamined Patent Application Publication No. 2002-81210A) describes "A concrete curing sheet laid on a concrete surface, in which an amount of moisture lost by the concrete surface is replenished, and the concrete is preserved in a wet state and cured. The concrete curing sheet is provided with a base material sheet, and a plurality of protrusions secured on the side laid on the concrete surface of the base material sheet with spaces being formed between each of the protrusions, each of the protrusions having a width of 2 to 20 mm, each of the protrusions being arrayed two dimensionally, and each of the protrusions being formed from a wet material which swells upon absorbing water. When the concrete curing sheet is laid on the concrete surface, each protrusion swells as a result of absorbing water, the side surfaces of each protrusion bulge into each of the spaces, each space is narrowed, the concrete curing sheet holds a flat shape, the surfaces of each protrusion contact the concrete surface, and each protrusion replenishes the moisture on the concrete surface."

Patent Document 2 (Japanese Unexamined Patent Application Publication No. H10-46816A) describes "A method for curing a poured formed concrete body, in which, after removing a framework for forming the concrete body, a curing sheet, which is provided with a fiber material and a porous drain tube embedded in the fiber material, is installed to cover the surface of the concrete body such that the fiber material contacts the surface of the concrete body and the porous drain tube is substantially horizontal, and water is supplied through the porous drain tube".

SUMMARY OF THE INVENTION

The concrete curing sheet of Patent Document 1 has a wet material which swells upon absorbing water (for example, refer to claim 1). In addition, in the concrete body curing method of Patent Document 2, moisture is diffused and held in the fiber material of the sheet (for example, refer to the Abstract).

In a curing method as described above in which a sheet which absorbs, diffuses, and/or holds moisture in the inside thereof instead of on the surface of the sheet faces (is held in contact with, or close proximity to) the concrete surface, the moisture which is absorbed, diffused, and/or held in the sheet is necessary, in addition to the moisture necessary for the hydration reaction of the concrete. In addition, when supplementing moisture on the concrete surface portion where the moisture is insufficient, the supply of the moisture to the concrete conflicts with the absorption, diffusion, and/or holding of the moisture in the sheet. Accordingly, curing methods using such a sheet require more water and, in addition, there are temporal and local variations in the moisture amounts supplied to the concrete surface.

The present disclosure provides a sheet, a system, and a method for curing concrete, where the moisture amount to be used is small and it is possible to reduce temporal and local variations in moisture amounts supplied to a concrete surface.

According to some embodiments of the present disclosure, there is provided a concrete curing sheet including a solid structure group on at least a first surface. The solid structure group has grooves defined between adjacent solid structures, and the grooves transport water using a capillary phenomenon.

According to some embodiments of the present disclosure, there is provided a concrete curing system including a sheet including a solid structure group on at least a first surface, the solid structure group having grooves defined between adjacent solid structures, and the grooves transporting water using a capillary phenomenon; and at least one member selected from the group consisting of a first member provided with at least one function selected from the group consisting of scattering-preventing properties, anti-skid properties, weather resistant properties, heat resistance, scratch resistant properties, thermal insulation properties, heat-shielding properties, heat dissipation properties, heat generating properties, light-shielding properties, and dust resistant properties and fitted so as to be arranged on a second surface opposing the first surface of the sheet; a second member provided with wettability or water retention properties and fitted so as to be arranged on the first surface of the sheet or the concrete surface; and a third member (also referred to herein as a sealing member) which is fitted so as to seal an outer edge section of the sheet and the concrete surface or an outer edge section of an adjacent sheet.

According to some embodiments of the present disclosure, there is provided a concrete curing method including: preparing a sheet including a solid structure group on at least a first surface, the solid structure group having grooves defined between adjacent solid structures, and the grooves transporting water using the capillary phenomenon; bringing the first surface of the sheet to face the concrete surface (into close proximity to, or contact with, the concrete surface) to interpose water between the first surface of the sheet and the concrete surface; and removing the sheet from the concrete surface after a predetermined time.

According to some embodiments of the present disclosure, there is provided a method for producing a concrete structure including preparing a sheet including a solid structure group on at least a first surface, the solid structure group having grooves defined between adjacent solid structures, and the grooves transporting water using the capillary phenomenon; bringing the first surface of the sheet to face the concrete surface (into close proximity to, or contact with, the concrete surface) to interpose water between the first surface of the sheet and the concrete surface; and forming cured concrete by removing the sheet from the concrete surface after a predetermined time.

According to the sheet, system, and concrete curing method for curing concrete and the method for producing a concrete structure of the present disclosure, even when water is not absorbed, diffused, and/or held in the sheet, when water is consumed from the concrete surface by a hydration reaction in the concrete or by evaporation or the like to the outside during the curing, it is possible to supplement water for the consumed portion by transporting water from the periphery using the capillary phenomenon. Accordingly, it is possible for the sheet, system, and concrete curing method for curing concrete and the method for producing concrete structures of the present disclosure to reduce the moisture amount to be used and to reduce temporal and local variations in the moisture amount supplied to the concrete surface. Due to this, it is possible to obtain concrete structures with properties closer to the design values, for example, strength, durability, and appearance.

Furthermore, the above description must not be construed as having disclosed all the embodiments of the present invention nor all the advantages related to the present invention.

BRIEF DESCRIPTION OF THE DRAWINGS

FIG. 11A is a schematic diagram of some embodiments for curing concrete of the present disclosure. FIG. 11B is an enlarged cross-sectional diagram of between a sheet and a concrete surface of FIG. 11A.

FIG. 12A is a schematic diagram of some embodiments for curing concrete of the present disclosure. FIG. 12B is an enlarged cross-sectional diagram of between a sheet and a concrete surface of FIG. 12A.

DETAILED DESCRIPTION

Below, with an object of illustrating typical embodiments of the present invention, more detailed description will be given with reference to the drawings as necessary; however, the present disclosure is not limited to these embodiments and drawings.

According to some embodiments of the present disclosure, there is provided a concrete curing sheet having a solid structure group on at least a first surface, in which the solid structure group has grooves defined between adjacent solid structures, and the grooves transport water using the capillary phenomenon. The concrete curing sheet is used in the concrete curing system, the concrete curing method, and the method for producing of the concrete structure of the present disclosure.

In the present disclosure, the solid structure group refers to a collection of two or more solid structures having optional three-dimensional shapes. The three-dimensional shapes include rectangles, cubes, cones, frustums, hemispheres, partial spheres, columnar bodies, and combinations thereof. Adjacent solid structures may be in contact, or may be separated by being spaced at predetermined intervals.

The grooves are defined between adjacent solid structures. The shapes and dimensions of the grooves are optional as long as it is possible to transport water using the principle of the capillary phenomenon. In general, the capillary phenomenon is a phenomenon where a driving force (capillary force) which moves a liquid within a space acts on a liquid in narrow space based on the density of the liquid, the surface tension, the contact angle with the wall surface, and the like. In the grooves defined between the solid structures, the driving force which moves the liquid in the grooves is generated by the interfacial energy between the liquid and the wall surfaces of the grooves being lower than the interfacial energy between the air and the wall surfaces of the grooves. It is possible for a person skilled in the art to design the shapes and dimensions of the grooves such that a driving force with a desired value acts with respect to the water.

Figure 14A:
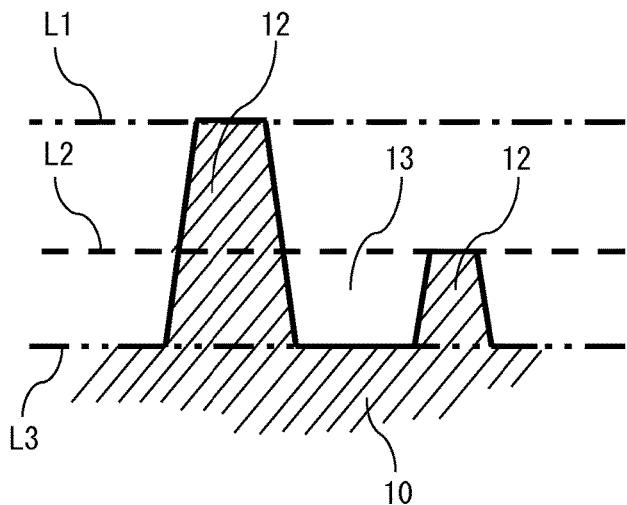
FIGS. 14A and 14B are schematic diagrams for illustrating a cross-sectional shape of a groove.
Figure 14B:
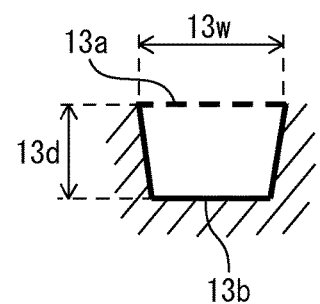
Figure 15:
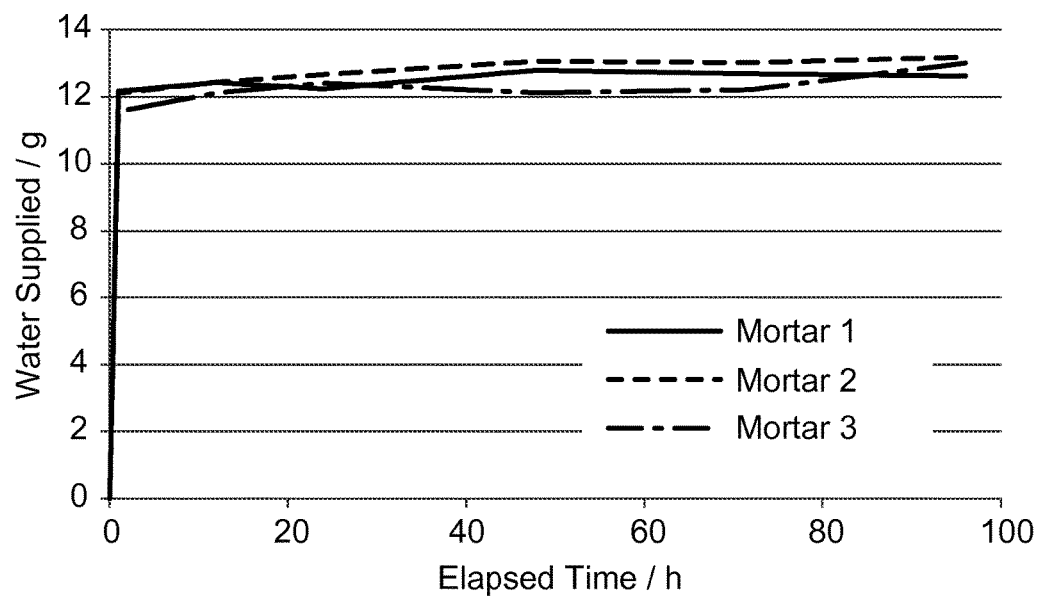
FIG. 15 is a graph illustrating changes in a water supply amount in Working Example 1.
Figure 16:
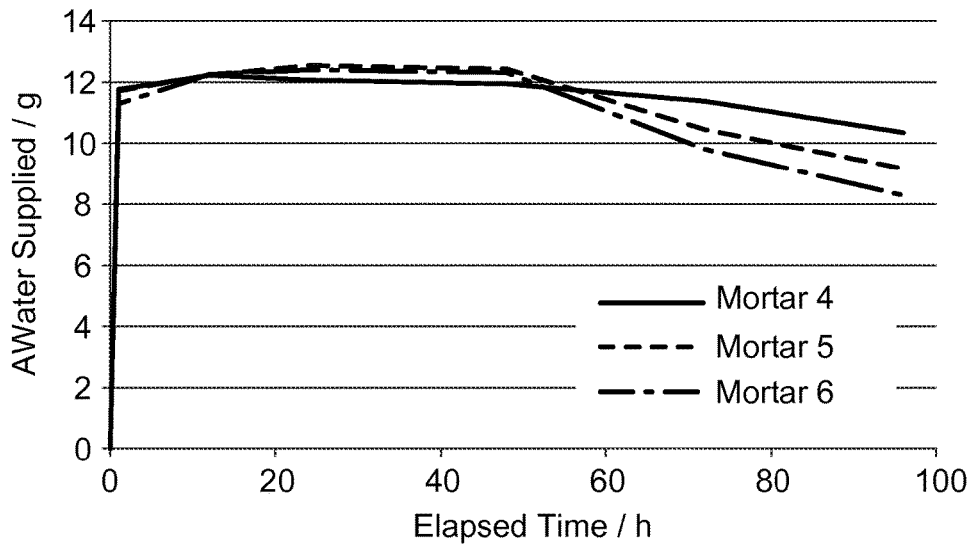
FIG. 16 is a graph illustrating changes in a water supply amount in Comparative Example 1.
Figure 17:
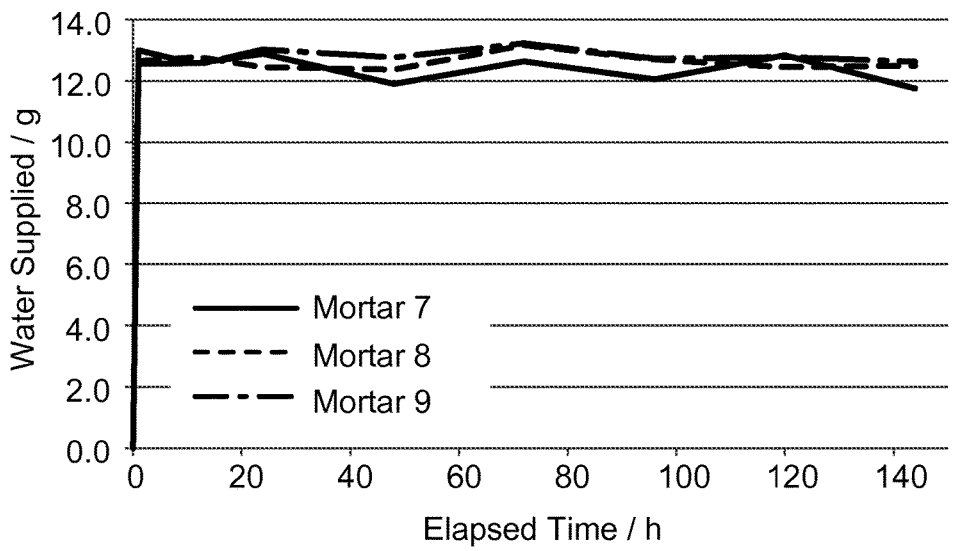
FIG. 17 is a graph illustrating changes in a water supply amount in Working Example 2.
Figure 18:
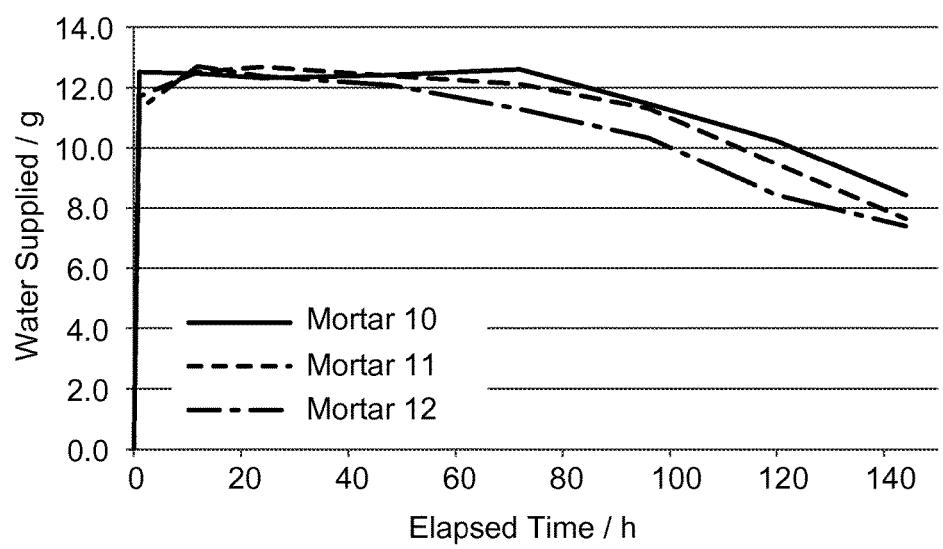
FIG. 18 is a graph illustrating changes in a water supply amount in Comparative Example 2.

For convenience, description will be given by separating the shape of the grooves into the cross-sectional shape and the arrangement of the grooves. FIGS. 14A and 14B are for illustrating the cross-sectional shape of the grooves and are not intended to limit the cross-sectional shape of the grooves. In the present disclosure, when the first surface of the sheet is arranged to face (in close proximity to, or contact with) the concrete surface, a flat surface parallel with the concrete surface is referred to as a reference plane L1 of the sheet (the long dashed short dashed line in FIG. 14A). In addition, a surface which is substantially parallel with respect to the reference plane L1 and on which solid structures 12 are arranged is shown by a virtual straight line L3 (the long dashed double-short dashed line in FIG. 14A). In the present disclosure, when determining the cross-sectional shape of the grooves, assuming a straight line L2 (the broken line in FIG. 14A) substantially parallel with the straight line L3, the shape of the maximum cross-sectional area of the grooves 13 which is formed with surrounded by the straight line L2 and the cross section of the sheet is defined as the cross-sectional shape of the grooves. For example, as illustrated in FIG. 14A, in a case of grooves where the heights of adjacent solid structures 12 are different, the cross-sectional shape of the grooves is the shape illustrated in FIG. 14B. The heights of the solid structures may be the same or may be different. The cross-sectional shape of the grooves may be the same throughout all of the grooves, or may be different. Below, for convenience, in the cross-sectional shape of the grooves, a portion configured by the straight line L2 described above is referred to as a groove opening section 13a and a portion which is most distant from the opening section 13a in the direction perpendicular to the reference plane L1 is referred to as a groove deepest section 13b. In addition, the distance between the opening section and the deepest section of the groove is referred to as a groove depth 13d and the maximum value of the width of the cross-sectional shape of the groove is referred to as a groove maximum width 13w. In another embodiment, wherein the heights of adjacent solid structures 12 are both the same as the height of the taller solid structure 12 in FIG. 14A, straight line L2, running substantially parallel with the straight line L3, would contact the top surface of both adjacent solid structures 12 and define a larger cross-sectional shape than that described above in which a solid structure 12 is shorter than another solid structure. In the present disclosure, the arrangement of the grooves refers to the arrangement of the grooves when viewed from a direction orthogonal to the reference plane L1.

The cross-sectional shape of the grooves is not limited as long as it is possible to transport water using the capillary phenomenon. The cross-sectional shape of the grooves includes polygons with the opening section set as one side, for example, triangles, quadrangles, and trapezoids; shapes able to be surrounded by the opening section and an appropriately curved line, for example, semi-circles, arc shapes, and wedges; and combinations thereof.

The upper limit of the depth of the grooves is, for example, approximately 3000 micrometers or less, approximately 2500 micrometers or less, approximately 2000 micrometers or less, approximately 1500 micrometers or less, approximately 1000 micrometers or less, or approximately 800 micrometers or less, and the lower limit is, for example, approximately 1 micrometers or more, approximately 5 micrometers or more, approximately 10 micrometers or more, approximately 30 micrometers or more, approximately 50 micrometers or more, or approximately 100 micrometers or more.

The upper limit of the maximum width of the grooves is, for example, approximately 3000 micrometers or less, approximately 2500 micrometers or less, approximately 2000 micrometers or less, approximately 1500 micrometers or less, approximately 1000 micrometers or less, or approximately 800 micrometers or less, and the lower limit is, for example, approximately 1 micrometers or more, approximately 5 micrometers or more, approximately 10 micrometers or more, approximately 30 micrometers or more, approximately 50 micrometers or more, or approximately 100 micrometers or more. The width of the opening section and the width of the deepest section may be the same, or may be different.

The arrangement of the grooves is not limited as long as it is possible to transport water using the capillary phenomenon. The arrangement of the grooves may include linear shapes, curved shapes, wavy shapes, polygonal shapes, cyclic shapes, radial shapes, parallel, non-parallel, random, and intersecting, and may include patterned arrangements where these arrangements are combined, for example, mesh shapes.

The grooves may be elongated in one direction. In the present disclosure, the groove being elongated in one direction refers to the groove having a sufficient length in a certain direction such that it is possible for the groove to transport water a desired distance in the direction using the capillary phenomenon. In the present disclosure, the length of the groove refers to the distance between the two most distant communicating points in one groove, regardless of the arrangement of the grooves. The lower limit of the length of the groove is, for example, approximately 3 mm or more, approximately 5 mm or more, approximately 10 mm or more, or approximately 100 mm or more, and the upper limit can be set to the length of the sheet or less, approximately 10 m or less, approximately 5 m or less, approximately 2 m or less, or approximately 1 m or less.

It is possible to optionally arrange the grooves according to the arrangement of the solid structures. It is possible to optionally set the pitch of the grooves, that is, the distances between the midpoints of the opening sections of adjacent grooves. The upper limit of the pitch of the grooves is, for example, approximately 3000 micrometers or less, approximately 2500 micrometers or less, approximately 2000 micrometers or less, approximately 1500 micrometers or less, approximately 1000 micrometers or less, or approximately 800 micrometers or less, and the lower limit is, for example, approximately 1 micrometers or more, approximately 5 micrometers or more, approximately 10 micrometers or more, approximately 30 micrometers or more, approximately 50 micrometers or more, or approximately 100 micrometers or more.

The grooves may be independent of each other, or may be integral to communicate at least partially. The communicating includes intersections, branching (merging), cross-linking, or the like.

Figure 1:
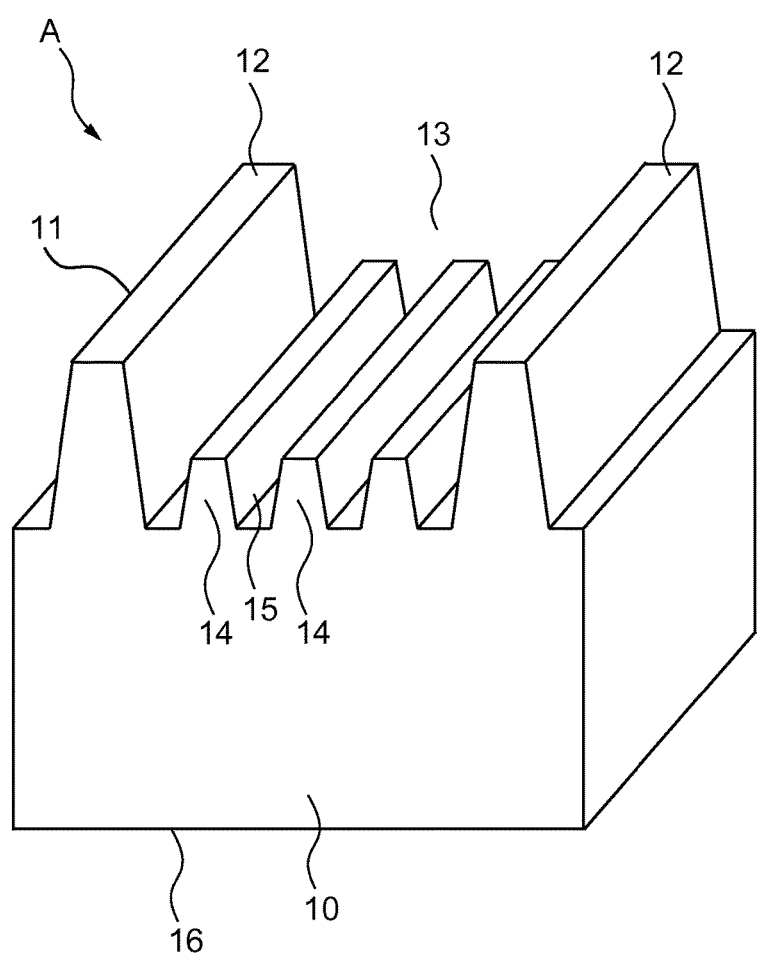
FIG. 1 is a schematic diagram of some embodiments of a concrete curing sheet of the present disclosure.

FIG. 1 is a schematic diagram illustrating some embodiments of the concrete curing sheet of the present disclosure. A sheet 10 has a first solid structure group formed of a plurality of first solid structures 12 with endview cross-sections which are substantially trapezoidal in shape, a top surface 11, and has the first groove 13 defined between adjacent first solid structures. In addition, the sheet 10 has a second solid structure group formed of a plurality of second solid structures 14 with endview cross-sections which are substantially trapezoidal in shape in each of the first grooves 13. Second grooves 15 are defined between adjacent first and second solid structures, and between adjacent second solid structures. The sheet 10 has a second surface 16. The endview cross-sectional shapes of the first and second grooves are substantially trapezoidal in which an opening is provided on the long side of the trapezoidal. It is possible for the first groove to fulfill a role of holding water such that it is possible to interpose more water between the sheet and the concrete. In addition to this, it may be possible for the first groove to transport water using the capillary phenomenon. It is possible for the second grooves to have a cross-section shape which is smaller than the first groove and to mainly fulfill a role of transporting water using the capillary phenomenon. The first and second grooves are substantially arranged in parallel. Below, for convenience, this groove shape as shown in FIG. 1 is referred to as "groove shape A".

Figure 2:
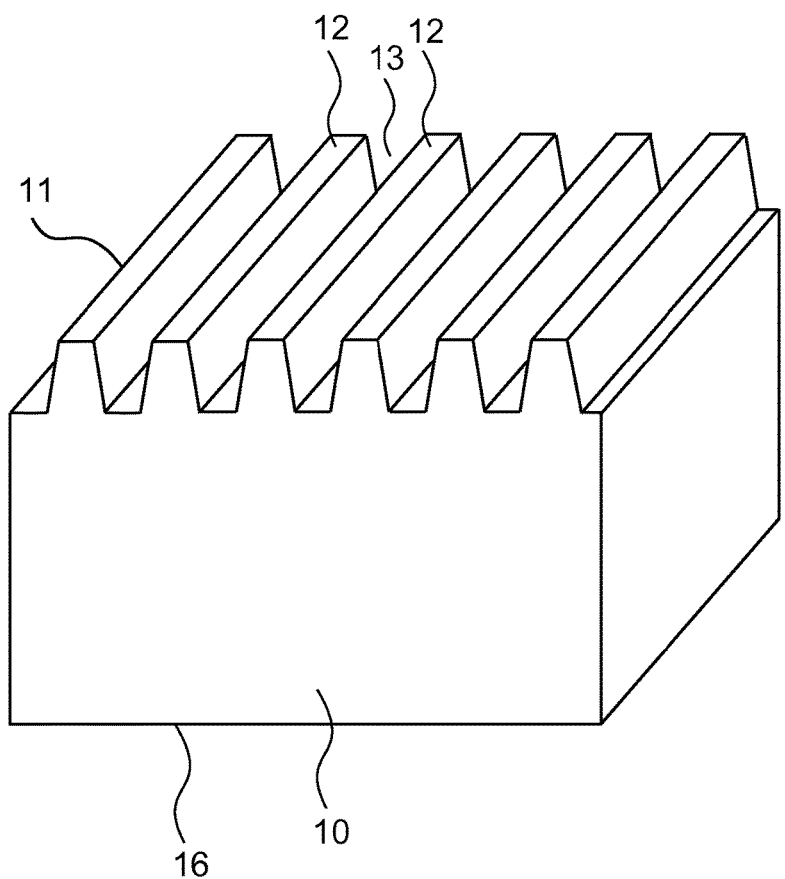
FIG. 2 is a schematic diagram of some embodiments of a concrete curing sheet of the present disclosure.

FIG. 2 is schematic diagram illustrating some embodiments of the concrete curing sheet of the present disclosure. The sheet 10 has a solid structure group formed of a plurality of solid structures 12 which have endview cross-sections which are substantially trapezoidal in shape, a top surface 11, and has the grooves 13 defined between the adjacent solid structures 12. The sheet 10 has a second surface 16. The cross-sectional shape of the grooves is substantially trapezoidal in which an opening is provided on the long side of the trapezoidal. The grooves are arranged substantially in parallel.

Figure 3:
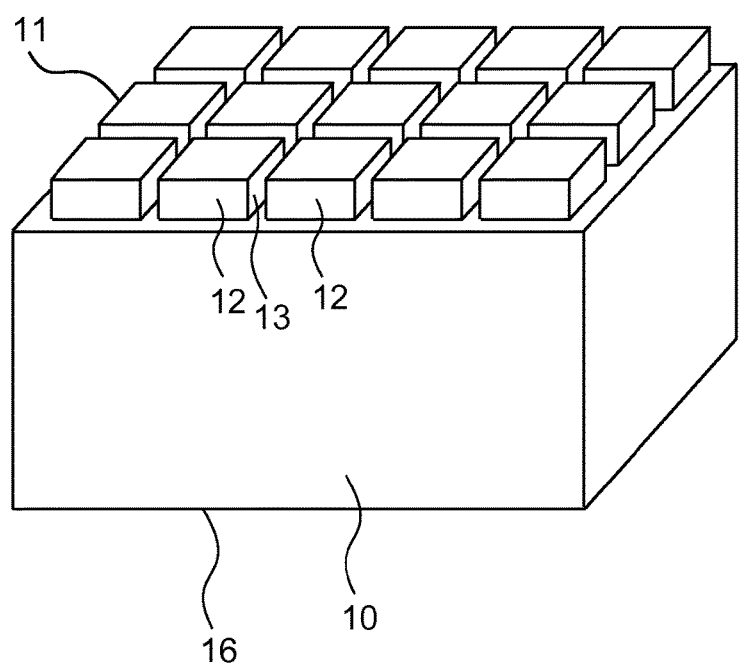
FIG. 3 is a schematic diagram of some embodiments of a concrete curing sheet of the present disclosure.

FIG. 3 is a schematic diagram illustrating some embodiments of the concrete curing sheet of the present disclosure. The sheet 10 has a solid structure group formed of a plurality of the solid structures 12, which have endview cross-sections which are substantially rectangular in shape, a top surface 11, and has the grooves 13 defined between the adjacent solid structures 12. The sheet 10 has a second surface 16. Regarding the arrangement of the grooves, a first set of substantially parallel grooves and a second set of substantially parallel grooves are arranged in a substantially orthogonal and intersecting pattern relative to each other to provide a mesh shape.

Figure 4:
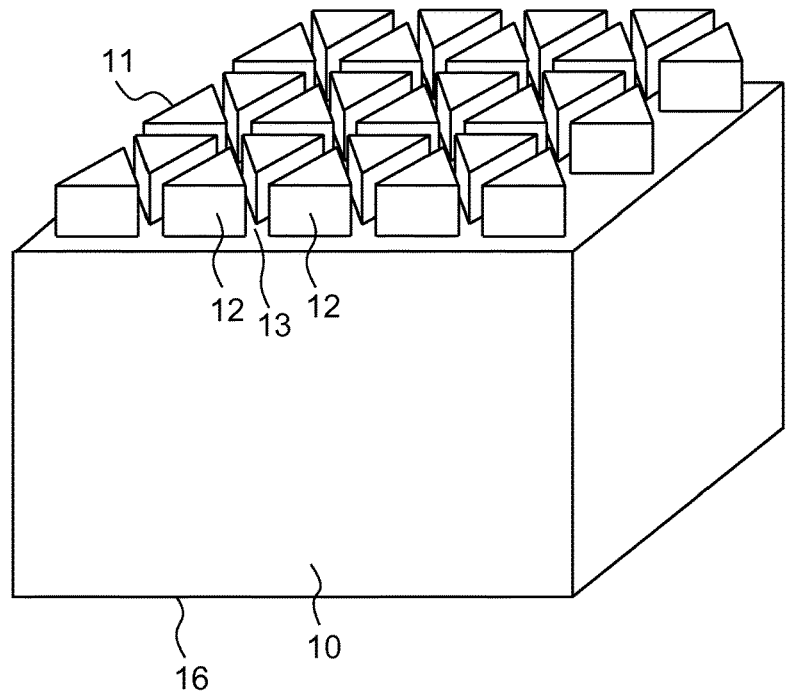
FIG. 4 is a schematic diagram of some embodiments of a concrete curing sheet of the present disclosure.

FIG. 4 is a schematic diagram illustrating some embodiments of the concrete curing sheet of the present disclosure. The sheet 10 has a solid structure group formed of a plurality of the solid structures 12, which are substantially triangular columns, which have endview cross-sections which are substantially rectangular in shape, a top surface 11, and has the grooves 13 defined between adjacent solid structures 12. The sheet 10 has a second surface 16. Regarding the arrangement of the grooves, a first set of substantially parallel grooves, second set of substantially parallel grooves, and third set of substantially parallel grooves are arranged in a substantially intersecting pattern relative to each other and at predetermined angles to provide a mesh shape Grooves belonging to the first, second, and third sets coincide at the intersection points.

Figure 5:
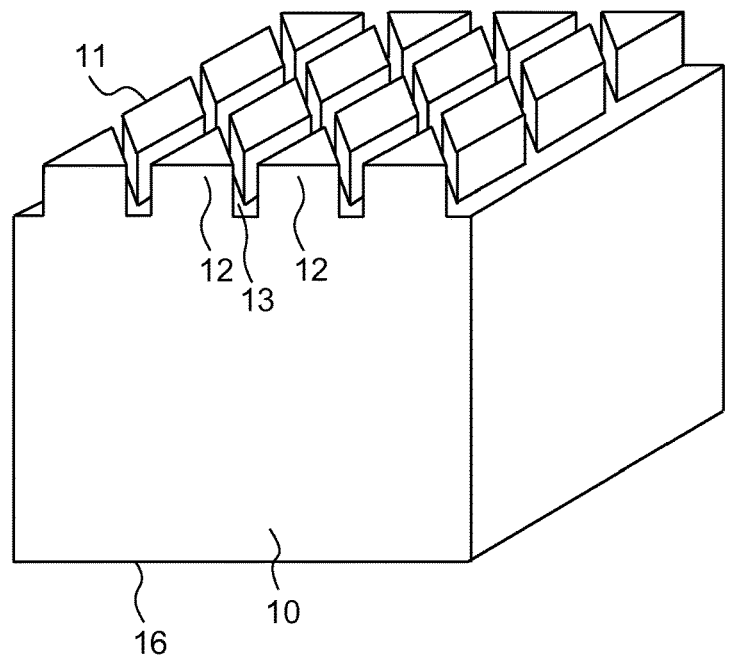
FIG. 5 is a schematic diagram of some embodiments of a concrete curing sheet of the present disclosure.

FIG. 5 is a schematic diagram illustrating some embodiments of the concrete curing sheet of the present disclosure. The sheet 10 has a solid structure group formed of a plurality of solid structures 12 with columnar bodies having a top surface 11 with an approximate parallelogram shape, and grooves 13 defined between adjacent solid structures 12. The sheet 10 has a second surface 16. The endview cross-sectional shape of the grooves is substantially rectangular. Regarding the arrangement of the grooves, a first set of substantially parallel grooves and second set of substantially parallel grooves are arranged in a substantially intersecting pattern relative to each other and at predetermined angles to provide a mesh shape.

Figure 6:
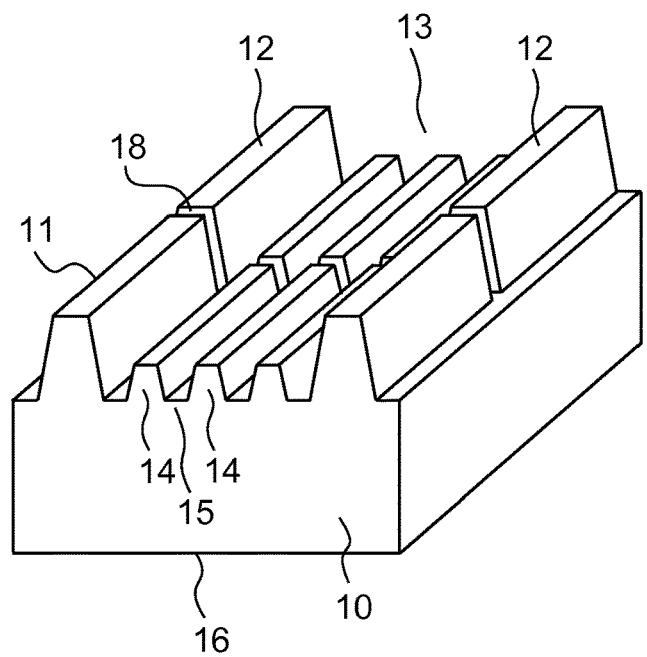
FIG. 6 is a schematic diagram of some embodiments of a concrete curing sheet of the present disclosure.

FIG. 6 is schematic diagram illustrating some embodiments of the concrete curing sheet of the present disclosure. The sheet 10 has a solid structure group formed of a plurality of solid structures 12 having an endview cross-section substantially trapezoidal in shape, a top surface 11, and has the first groove 13 defined between adjacent first solid structures 12 with the groove shape A as illustrated in FIG. 1. In addition, the sheet 10 has a second solid structure group formed of a plurality of second solid structures 14 with endview cross-sections which are substantially trapezoidal in shape, a top surface 11, and has the second groove defined between adjacent first and second solid structures, for example 12 and 14, and between adjacent second solid structures, for example 14 and 14. The grooves 13 (defined by solid structures 12) and 15 (defined by solid structures 14) communicate through an extending communication groove 18 intersecting substantially orthogonally with the grooves 13 and 15. The sheet 10 has a second surface 16. It is possible for the communication groove 18 to help the movement of water between the adjacent grooves 13 and the adjacent grooves 15.

Figure 7:
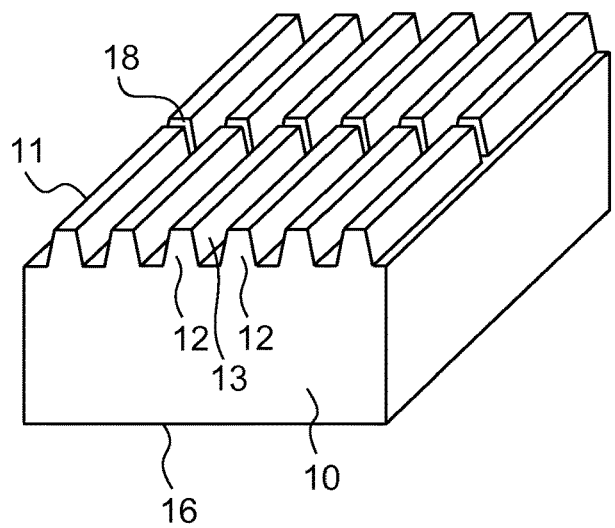
FIG. 7 is a schematic diagram of some embodiments of a concrete curing sheet of the present disclosure.

FIG. 7 is a schematic diagram illustrating some embodiments of the concrete curing sheet of the present disclosure. The sheet 10 has a solid structure group formed of a plurality of solid structures 12 having an endview cross-section substantially trapezoidal in shape, a top surface 11, and has the groove 13 defined between adjacent solid structures 12. The cross-sectional shape of the grooves is substantially trapezoid in which an opening is provided on the long side of the trapezoid. The grooves 13 are arranged substantially in parallel to each other as are communication grooves 18. The grooves 13 communicate through the extending communication groove 18 intersecting substantially orthogonally with the grooves 13. It is possible for the communication groove 18 to help the movement of water between adjacent grooves 13.

The first surface of the sheet may be hydrophilic. In a case where the first surface is hydrophilic, it is possible to increase the capillary force acting on the water and to more effectively transport the water. In the present disclosure, the "first surface of the sheet is hydrophilic" means that, when a sheet having a first surface with a substantially planar shape without grooves is made using the same material as the hydrophilic sheet, the contact angle between the first surface of the sheet and the liquid surface of the water is less than 90°. It is possible for the upper limit of the contact angle to be set to, for example, less than 80°, less than 70°, less than 60°, less than 50°, less than 40°, less than 30°, less than 20°, or less than 15°.

In the present disclosure, after placing a sheet cut to be 12 mm vertically and 160 mm horizontally on a horizontal surface, the distance (mm) spread by 0.4 mL of water in one minute on the first surface is referred to as the "water transport distance", and set as an index when confirming the wettability of the sheet surface of the grooves or the like. The water transport distance primarily depends on the structure of the grooves and the degree of hydrophilicity of the first surface and there is a tendency for the water transport distance to increase in a case where the first surface of the sheet is hydrophilic. In more detail, it is possible for the water transport distance to be measured using the following water transport distance test. A test solution is produced by adding 0.2 g of red Pilot Ink (registered trademark), which is an aqueous ink available from Pilot Corp. (Chuo-ku, Tokyo), to 50 g of tap water. A sheet cut to be 12 mm vertically and 160 mm horizontally is prepared. However, in a case where there is anisotropy in the liquid transporting ability of the sheet, cutting is carried out such that the liquid transporting ability is greatest in the longitudinal direction. A reference line is drawn with an oil-based pen at a position 10 mm from one end of the sheet and the sheet is placed on a horizontal surface with the first surface set to be on top. 0.4 mL of the test solution is measured out using a 1 ml (centric tip) Terumo Syringe (registered trademark) which is a syringe available from Terumo Corporation (Shibuya-ku, Tokyo), and dropped to the reference line. After one minute passes from the dropping, the distance from the reference line up to the end portion of the movement of the test solution is measured and set as the water transport distance. In the present disclosure, the distance of water transport distance is, for example, preferably 50 mm or more, 100 mm or more, or 150 mm or more.

The first member may be arranged on the second surface opposing the first surface of the sheet. The first member includes members provided with at least one function selected from the group consisting of scattering-preventing properties, anti-skid properties, weather resistant properties, heat resistance, scratch resistant properties, thermal insulation properties, heat-shielding properties, heat dissipation properties, heat generating properties, light-shielding properties, and dust resistant properties. The first member may be attached or bonded to a part or the whole of the second surface of the sheet. The first member may have the same dimensions as the sheet, or may have different dimensions.

The first member having scattering-preventing properties includes nets, scaffolding wood, sandbags, rubber sheets, blocks, and the like. It is possible for adhesive tape, adhesive film, or the like able to adhere the concrete curing sheet to the concrete surface to function as the first member having scattering-preventing properties. By using the first member having scattering-preventing properties, it is possible to prevent or reduce the movement of the concrete curing sheet during the curing due to wind, vibrations, or the like.

The first member having anti-skid properties includes a foam sheet, a resin sheet roughened by an embossing process or the like, a slip resistant sheet to which solid shapes such as dots, blocks, and grooves are imparted, and the like. By using the first member having anti-skid properties, it is possible to prevent sliding or falling during the installation or removal of the concrete curing sheet when builders move on the sheet.

A first member having weather resistant properties includes a weather resistant sheet containing anti-oxidants or the like, a UV cut sheet or film containing an ultraviolet absorber or the like, a snow protection sheet or net, or the like. By using the first member having weather resistant properties, it is possible to protect the concrete curing sheet from the external environment over long periods and to stably cure the concrete.

The first member having heat resistant properties includes sheets such as carbon cloth, carbon felt, chloroprene rubber (CR), nitrile rubber (NBR), and silicone rubber, heat resistant sheets such as silicone coated polyester fiber cloth, and the like. By using the first member having heat resistance, it is possible to protect the concrete curing sheet from a heat source during the installation of the concrete curing sheet or during the curing of the concrete.

The first member having scratch resistant properties includes a film or sheet subjected to a hard coating treatment, a thin metal plate, or the like. By using the first member having scratch resistant properties, it is possible to prevent damage to the concrete curing sheet during the installation of the concrete curing sheet or in the curing of the concrete.

The first member having thermal insulation properties includes foam heat insulating materials such as a bubble wrap material, foam polystyrene, or foam polyurethane, or sheets such as glass wool, rock wool, and the like. By using the first member having thermal insulation properties, it is possible to maintain the temperature required for the concrete curing even in low temperature environments.

The first member having heat-shielding properties includes metal foils such as aluminum, stainless steel, nickel, silver, and copper, and films having metal vapor deposition films such as aluminum, stainless steel, nickel, silver, and copper, infrared reflecting prism sheets, or the like. By using the first member having heat-shielding properties, it is possible to suppress excessive increases in the curing temperature of the concrete and/or the evaporation of moisture used in the curing in a high-temperature environment or due to the incidence of sunlight.

The first member having heat dissipation properties includes metal plates such as aluminum, stainless steel, nickel, silver, and copper. Surface shapes for increasing the heat dissipation, for example, fins or grooves, may be provided on these metal plates. The first member having heat dissipation properties is generally arranged in close contact with the concrete curing sheet in order to effectively perform heat dissipation using heat conduction. By using the first member having heat dissipation properties, it is possible to maintain the curing temperature at a desired temperature by allowing the heat generated in the concrete curing to dissipate to the outside.

The first member having heat generating properties includes a sheet heater, a heat generating body using the oxidizing effect of iron powder, and the like. By using the first member having heat generating properties, it is possible to supply heat energy for maintaining the temperature required in the concrete curing to the concrete during the curing.

The first member having light-shielding properties includes metal foils such as aluminum, stainless steel, nickel, silver, and copper, and films having metal vapor deposition films such as aluminum, stainless steel, nickel, silver, and copper, prism sheets, or the like. By using the first member having light-shielding properties, it is possible to suppress light deterioration in the concrete curing sheet.

A first member having dust resistant properties includes resin films or sheets. These resin films or sheets may have a surface treatment or coating for preventing the attachment of dust to the surface which is exposed to the outside. By using the first member having dust resistant properties, it is possible to prevent contamination of the concrete curing sheet.

In one embodiment, for example, scattering-preventing properties, weather resistant properties, thermal insulation properties, light-shielding properties, or the like may be imparted by increasing the thickness of the sheet itself.

The second member provided with wettability or water retention properties may be arranged on the first surface of the sheet. The second member may be attached or bonded to a part or the whole of the first surface of the sheet. The second member may have the same dimensions as the sheet, or may have different dimensions. A plurality of second members may be arranged on the first surface of the sheet.

In some embodiments, a second member is arranged over the entire surface of the first surface of the sheet, and the moisture supply to the concrete surface at this time is performed via the second member. In some embodiments, it is possible to hold a larger amount of water between the sheet and the concrete surface. In some embodiments, the second member having water retention properties is arranged on a peripheral edge portion of the first surface of the sheet. In some embodiments, it is possible to prevent or reduce leakage or leaching of the water, which is interposed between the first surface of the sheet and the concrete surface, to the outside.

Second members having wettability include woven fabric, non-woven fabric, knitted fabric, nets, sponge mats, and the like. Second members having water retention properties include a water-absorbing polymer, woven fabric, non-woven fabric, sponge mats, and the like.

The sheet may have a water supply inlet in the first surface and/or the periphery thereof. The form of the water supply inlet is not limited as long as it is possible to supply water to at least a part of the first surface of the sheet. The water supply inlet includes one or more holes communicating from the second surface of the sheet to the first surface, a manifold having a slit formed on the periphery of the first surface of the sheet and communicating with the first surface, or a foam material, for example, a sponge, or the like. The water supply inlet may be designed so as to be able to uniformly supply water to at least one side of the first surface of the sheet.

The material of the sheet is not particularly limited; however, from the viewpoint of workability it is possible to use, for example, a resin material. The resin material includes polymers having a polyolefin resin, a polyoxyethylene chain, or the like. As polymers having a polyolefin resin, a polyoxyethylene chain, or the like, it is possible to use the materials described in Japanese Unexamined Patent Application Publication No. 2007-277474.

The resin material, from the viewpoint of hydrophilicity, includes, but is not limited to, a hydrophilic resin material, a resin material containing a hydrophilic filler, or combinations thereof. The hydrophilic resin material include antistatic agents, for example, polyhydric alcohol fatty acid esters, alkyl diethanolamine, and alkyl diethanolamide; surfactants, for example, alkane sulfonates; and resin materials having at least one hydrophilic group selected from —$SO_3H$, —$SO_3M$, —$OSO_3M$, —COOM, —$NR_3X$, —COOH, —$NH_2$, —CN, —OH, or combinations thereof at an end of the molecule, and, in the formula, R is an alkyl group, M is an alkali metal or —$NH_4$, and X is a halogen. The hydrophilic filler includes, but is not limited to, oxides, for example, silica, alumina, tin oxide, antimony oxide, and indium oxide; complex oxides, for example, tin-antimony composite oxide, and indium-tin composite oxide; or combinations thereof.

The method for producing the sheet is not limited as long as it is possible to form the grooves described above. The method for forming the grooves includes press forming, embossing, casting, etching, laser processing, and the like. Specifically, for example, it is possible to use the producing method described in Japanese Unexamined Patent Application Publication No. 2007-277474.

The first surface of the sheet may be subjected to a hydrophilic treatment. In the present disclosure, the "hydrophilic treatment" refers to a surface treatment which is able to increase the hydrophilicity of the first surface of the sheet. The hydrophilic treatment includes surface treatments, for example, blasting treatments, flame treatments, and ozone treatments; surface coating with a hydrophilic material; or combinations thereof. The hydrophilic material includes a hydrophilic resin material, a resin material containing a hydrophilic filler, or combinations thereof. The hydrophilic resin material includes antistatic agents, for example, polyhydric alcohol fatty acid esters, alkyl diethanolamine, and alkyl diethanolamide; surfactants, for example, alkane sulfonates; and resin materials having at least one hydrophilic group selected from —$SO_3H$, —$SO_3M$, —$OSO_3M$, —COOM, —$NR_3X$, —COOH, —$NH_2$, —CN, —OH, or combinations thereof at an end of the molecule, and, in the formula, R is an alkyl group, M is an alkali metal or —$NH_4$, and X is a halogen. The hydrophilic filler includes, but is not limited to, oxides, for example, silica, alumina, tin oxide, antimony oxide, and indium oxide; complex oxides, for example, tin-antimony composite oxide, and indium-tin composite oxide; or combinations thereof.

The concrete curing system according to some embodiments of the present disclosure has the concrete curing sheet described above; and at least one member selected from the group consisting of a first member provided with at least one function selected from the group consisting of scattering-preventing properties, anti-skid properties, weather resistant properties, heat resistance, scratch resistant properties, thermal insulation properties, heat-shielding properties, heat dissipation properties, heat generating properties, light-shielding properties, and dust resistant properties and fitted so as to be arranged on a second surface opposing the first surface of the sheet; a second member provided with wettability or water retention properties and fitted so as to be arranged on the first surface of the sheet or the concrete surface; and a third (sealing) member fitted so as to seal a peripheral edge portion of the sheet and the concrete surface or a peripheral edge portion of an adjacent sheet.

The first member may be attached or bonded in advance to the second surface of the concrete curing sheet, and may take a form which is provided as a separate member to the concrete curing sheet and able to be arranged by being placed in contact with, or attached or bonded with the second surface of the concrete curing sheet on site during the installation of the sheet. "Contact" in this case refers to simple contact without forming a physical attachment or bond and the same applies to the explanation for the second member and the third member below.

The second member may be attached or bonded in advance to the first surface of the concrete curing sheet, or may take a form which is provided as a separate member to the concrete curing sheet and able to be arranged by being placed in contact with, or attached or bonded with the first surface of the concrete curing sheet or the concrete surface on site during the installation of the sheet.

For the details and suitable embodiments of the first member and the second member, refer to the description of the concrete curing sheet described above.

The third, or sealing, member may be attached or bonded in advance to the first surface or the peripheral edge portion of the second surface of the concrete curing sheet, and may take a form of being provided as a separate member to the concrete curing sheet and able to be arranged by being placed in contact with, or attached or bonded with the first surface or the peripheral edge portion of the second surface of the concrete curing sheet during the installation of the sheet.

The sealing member includes adhesives, pressure sensitive adhesives, sealant, rubber, clay, gels, packing, viscous liquids, sealing tape, adhesive films, and the like. In some embodiments, as the sealing member, for example, adhesives, pressure sensitive adhesives, sealant, rubber, clay, gels, packing, or viscous liquids seal a gap between the sheet and the concrete surface at the sheet peripheral edge portion by being filled between the first surface of the concrete curing sheet and the concrete surface. In some embodiments, for example, a sealing tape, an adhesive film, or the like seals a gap between the sheet and the concrete surface at the sheet peripheral edge portion by being adhered so as to cover both of the second surface of the concrete curing sheet and the concrete surface. In this manner, by sealing the sheet peripheral edge portion and the concrete surface, it is possible to prevent leakage of the water, which is interposed between the first surface of the sheet and the concrete surface, to the outside, or volatilization of water vapor.

In some embodiments, for example, a sealing tape, an adhesive film, or the like is linked with the sheets and seals a gap between the sheets by being adhered to the second surface of the sheets so as to cover two or more adjacent concrete curing sheets. According to some embodiments, it is possible to cure concrete over a large area using a plurality of concrete curing sheets.

According to some embodiments of the present disclosure, the concrete curing system has the concrete curing sheet described above, and a water supply source which supplies water between the first surface of the sheet and the concrete surface. In accordance with some embodiments, the concrete curing system further has a water supply source which supplies water between the first surface of the sheet and the concrete surface in addition to the concrete curing sheet described above and the at least one member described above selected from the group consisting of the first member, the second member, and the third member (sealing member).

The water supply source is not particularly limited as long as it is possible to supply water between the first surface of the concrete curing sheet and the concrete surface. The water supply source includes a container filled with water, or a faucet for a water pipe. The container may be open to the ambient environment, or may be sealed.

The form for supplying water from the water supply source between the first surface of the sheet and the concrete surface is not limited as long as it is possible for the water from the water supply source to contact at least a part of the first surface of the sheet. For example, a part of the sheet may be immersed in water in the water supply source, the water supply source and the sheet may be connected by a flow path, for example, a hose, a tube, a half pipe, a foam material, or the like, or the water from the water supply source may be sprayed on the sheet without using a flow path. Due to this, water is transported between the first surface and the concrete surface using the capillary phenomenon of the grooves.

Figure 8:
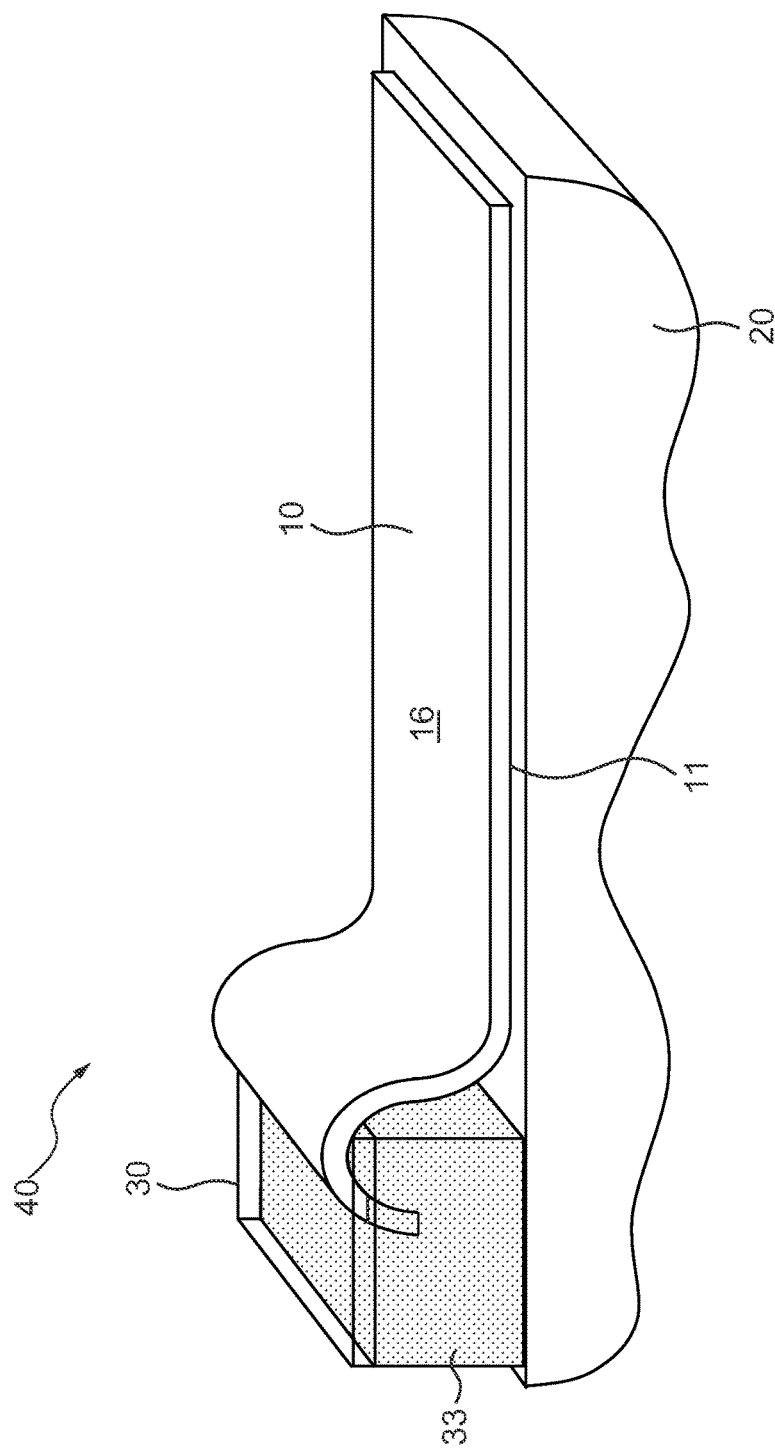
FIG. 8 is a schematic diagram of some embodiments of a concrete curing system of the present disclosure.

FIG. 8 is a schematic diagram of some embodiments of the concrete curing system of the present disclosure. A concrete curing system 40 has a water supply source 30 filled with water 33, and the concrete curing sheet 10. The sheet 10 has a second surface 16 and reference number 20 is a concrete. In addition, water is supplied between the first surface 11 and the concrete surface by immersing a part of the first surface 11 of the concrete curing sheet in water 33 in the container.

Figure 9:
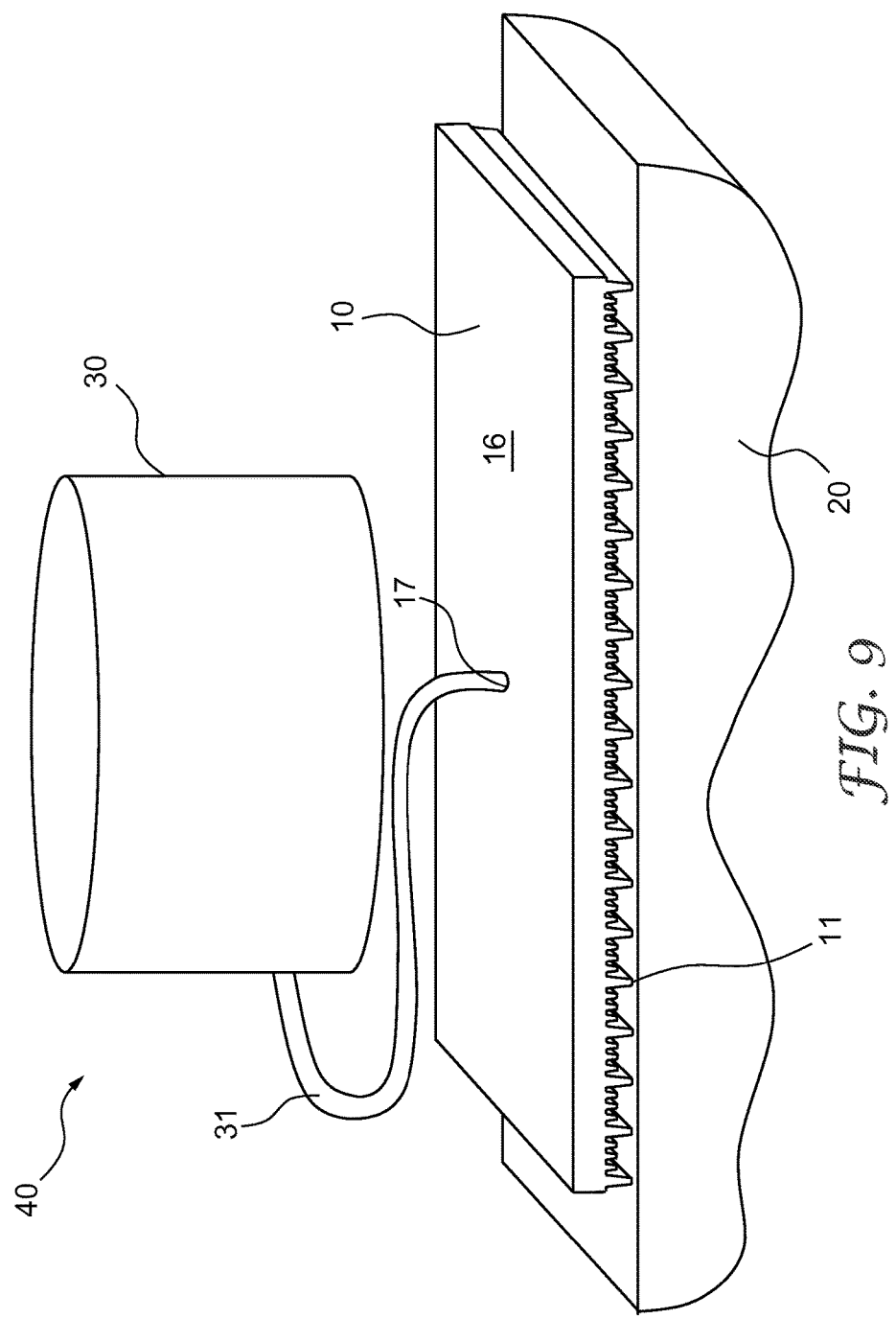
FIG. 9 is a schematic diagram of some embodiments of a concrete curing system of the present disclosure.

FIG. 9 is a schematic diagram of some embodiments of the concrete curing system of the present disclosure. The concrete curing system 40 has a tank filled with water as the water supply source 30, and the concrete curing sheet 10, and the sheet has a hole communicating from the second surface to the first surface 11 as a water supply inlet 17. The sheet 10 has a second surface 16. In addition, water is supplied between the first surface and the concrete surface by connecting the hole and the tank with a hose as a flow path 31.

Figure 10:
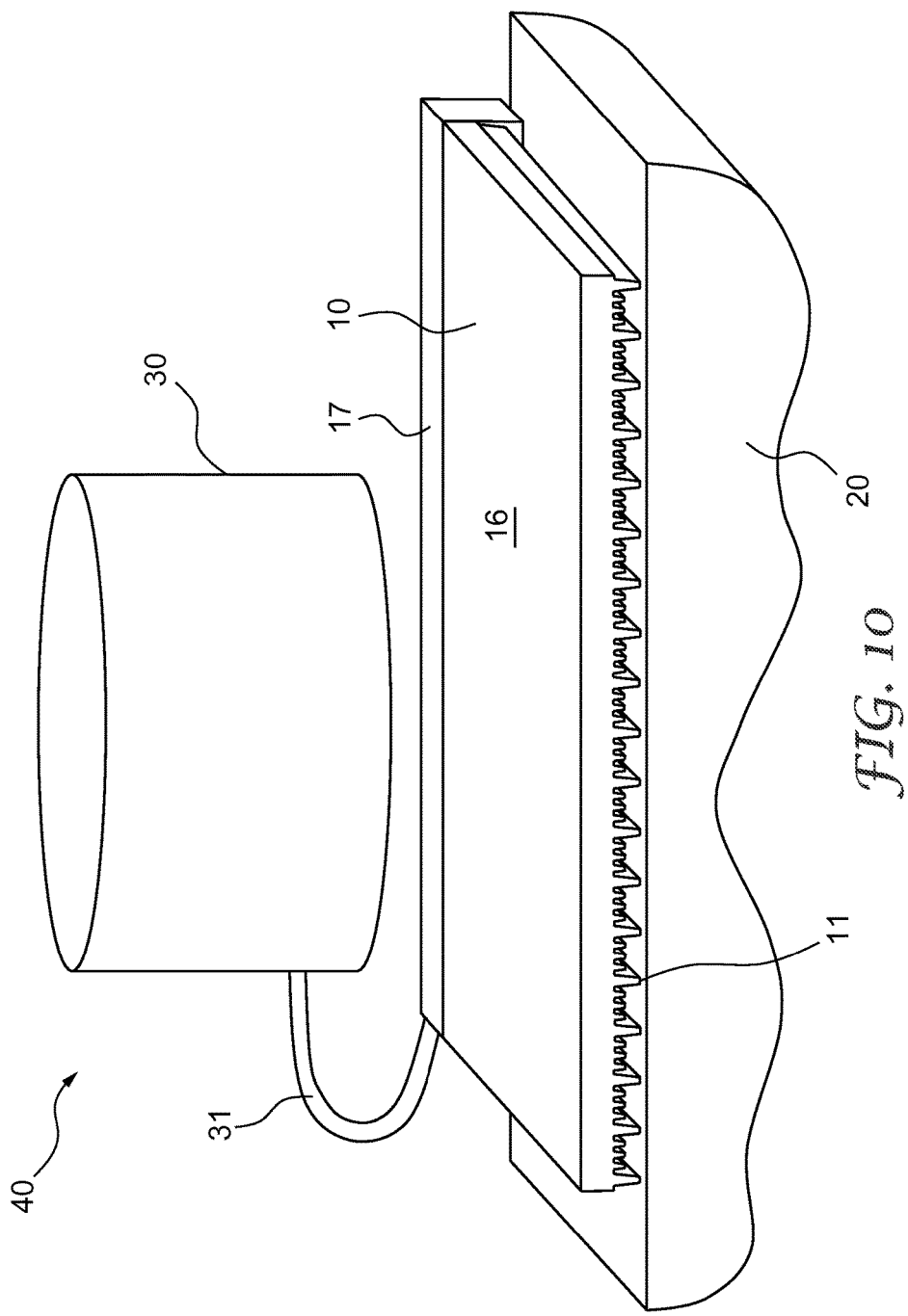
FIG. 10 is a schematic diagram of some embodiments of a concrete curing system of the present disclosure.

FIG. 10 is a schematic diagram of some embodiments of the concrete curing system of the present disclosure. The concrete curing system 40 has a tank filled with water as the water supply source 30, and the concrete curing sheet 10. The sheet 10 has a sponge which is formed on one side of the first surface 11 of the sheet and is able to uniformly carry water to one side of the first surface as the water supply inlet 17. The sheet 10 has a second surface 16. In addition, water is supplied between the first surface and the concrete surface by connecting the sponge and the tank with a hose as the flow path 31.

According to some embodiments of the present disclosure, the concrete curing method includes preparing the concrete curing sheet described above, and holding a state where the first surface of the sheet and the concrete surface are faced (in close proximity to, or in contact with) each other and water is interposed between the first surface of the sheet and the concrete surface.

In some embodiments, by water being provided to at least a part of the concrete surface, and the first surface of the sheet and the concrete surface being faced (in close proximity to, or in contact with) each other, the water enters a state of being interposed between the first surface of the sheet and the concrete surface.

In some embodiments, by water being provided to at least a part of the first surface of the sheet, and the first surface of the sheet and the concrete surface being in close proximity to, or in contact with, each other, the water enters a state of being interposed between the first surface of the sheet and the concrete surface.

In some embodiments, by the first surface of the sheet and the concrete surface being faced (in close proximity to, or in contact with) each other, and water being supplied from the water supply inlet described above, the water enters a state of being interposed between the first surface of the sheet and the concrete surface.

According to some embodiments, the concrete curing method further includes arranging a first member provided with at least one function selected from the group consisting of scattering-preventing properties, anti-skid properties, weather resistant properties, heat resistance, scratch resistant properties, thermal insulation properties, heat-shielding properties, heat dissipation properties, heat generating properties, light-shielding properties, and dust resistant properties, on the second surface opposing the first surface of the sheet.

According to some embodiments, the concrete curing method further includes arranging a second member provided with wettability or water retention properties on the first surface of the sheet or the concrete surface.

The first member and/or the second member may be arranged by attaching or bonding the first member and/or the second member in advance with respect to the concrete curing sheet prior to construction, or may be arranged by placing these members into contact with, or attaching or bonding with the concrete curing sheet on site during the installation of the sheet.

According to some embodiments, the concrete curing method includes sealing the peripheral edge portion of the sheet and the concrete surface or the peripheral edge portion of the adjacent sheet. It is possible to perform the sealing using the third, or sealing, member described above. The sealing member may be attached or bonded in advance to the concrete curing sheet prior to construction, or the sealing member may be attached or bonded with respect to the concrete curing sheet on site during the installation of the sheet.

For details and suitable embodiments of the first member, the second member, and the third member, refer to the description of the concrete curing sheet and the concrete curing system described above.

In a case of curing concrete on the floor surface, the sheet may be simply placed on the concrete surface, or the sheet may be secured to the concrete surface or another structural body (for example, a concrete frame or the like) using the first member having scattering-preventing properties and the second member or another securing member, for example, an adhesive tape, an adhesive film, a wrap, or the like. In some embodiments, the movement of the sheet during curing due to wind, vibrations, or the like may be reduced by making the weight of the sheet itself heavy.

In a case of curing concrete on a wall surface (referred to as a façade) or on a ceiling, the sheet may be attached to the concrete surface by the surface tension of the water, or may be secured using the second member or another securing member described above. The concrete curing sheet may be supported using a support plate such as an aluminum composite material, a fiber-reinforced plastic (FRP), an acrylic plate, or a polycarbonate plate. For example, in a case where the concrete surface is not flat, such as a tunnel inner wall or the like, the support plate may be curved or bent along the concrete surface.

According to some embodiments of the present disclosure, the concrete curing method includes removing the sheet from the concrete surface after being in place for a predetermined time.

It is possible to optionally set the predetermined time so as to obtain concrete characteristics, for example, strength, durability, and appearance, at a desired level. It is possible for a person skilled in the art to set an appropriate concrete curing time according to the type, temperature, or the like of the concrete to be used.

Below, illustrative embodiments of the concrete curing in the present disclosure will be described with reference to FIGS. 11A and 11B and FIGS. 12A and 12B.

FIGS. 11A and 11B are schematic diagrams of some embodiments of the concrete curing of the present disclosure. As shown in FIG. 11A, the concrete curing system 40 having the concrete curing sheet 10, and a water supply source 30 for holding the water 33 is prepared. The first surface 11 of the sheet is faced (in contact) with the upper surface of poured concrete 20. A part of the first surface 11 of the concrete curing sheet 10 is immersed in the water in the container. The sheet 10 has a second surface 16.

As shown in FIG. 11B, the sheet has grooves with the groove shape A illustrated in FIG. 1 on the first surface 11 and the grooves extend in the longitudinal direction of the sheet in FIG. 11A. The sheet 10 has a second surface 16. Accordingly, the water is transported in the direction indicated by the arrow in FIG. 11A using the capillary phenomenon in the grooves, and the water enters a state of being interposed between the first surface and the concrete surface. While this state continues, when water is consumed from the concrete surface by a hydration reaction in the concrete or by evaporation to the outside, the water is transported from the periphery using the capillary phenomenon of the grooves and the water supplements the consumed portion.

After this state continues for a predetermined time, the sheet is removed from the concrete surface. In some embodiments, the water is sucked upward using the capillary phenomenon of the grooves and transported in the longitudinal direction of the sheet without using a mechanical apparatus such as a pump for transporting the water.

FIGS. 12A and 12B are schematic diagrams of some embodiments of the concrete curing of the present disclosure. As shown in FIG. 12A, the concrete curing system 40 having the concrete curing sheet 10, and the tank for holding the water 33 as the water supply source 30 is prepared. The sheet has a water supply inlet 17 which is able to send the water to the first surface 11 on one side thereof. The first surface of the sheet is held by a securing member (not shown in the diagram) to the side surface of the poured concrete 20. By connecting the water supply inlet of the sheet and the tank with the flow path 31, water is sent to the first surface of the sheet.

As shown in FIG. 12B, the sheet has grooves with the groove shape A illustrated in FIG. 1 on the first surface 11, and the grooves extend in the longitudinal direction of the sheet in FIG. 12A. Accordingly, the water is transported in the direction indicated by the arrow in FIG. 12A using the capillary phenomenon in the grooves, and the water enters a state of being interposed between the first surface and the concrete surface. While this state is maintained, when water is consumed from the concrete surface by a hydration reaction in the concrete or by evaporation to the outside, the water is transported from the periphery using the capillary phenomenon of the grooves and the water supplements the consumed portion.

After this state continues for a predetermined time, the sheet is removed from the concrete surface. In the present embodiment, without using a mechanical apparatus such as a pump for transporting the water, the water is sent to the first surface of the sheet through the flow path and the water supply inlet by gravity from a tank which is placed higher than the sheet and transported in the longitudinal direction of the sheet using the capillary phenomenon of the grooves.

According to some embodiments of the present disclosure, there is provided a method for producing a concrete structure including forming concrete cured by the steps described in the concrete curing method described above.

EXAMPLES

In the following examples, the embodiments of the present disclosure will be described more specifically; however, the range of the present invention is not limited thereto.

Material

Concrete Curing Sheet

The following materials were used as the materials for the concrete curing sheet.

Sheet X: Using a hydrophilic-treated polyethylene as the material of the sheet, the concrete curing sheet (referred to below as "sheet X") of the examples was produced. The sheet X had grooves with the groove shape A as schematically illustrated in FIG. 1. The total thickness of the sheet X was 300 micrometers, and the first grooves 13 had a maximum width of 160 micrometers, a depth of 100 micrometers, and a pitch of 220 micrometers. The second grooves 15 had a maximum width of 16 micrometers, a depth of 30 micrometers, and a pitch of 50 micrometers. The sheet X had a water transport distance of 150 mm or more over one minute according to the water transport distance test described in the present disclosure. A sheet X which was cut to 120 mm vertically and 500 mm horizontally such that the grooves extended in the longitudinal direction of the sheet was used.

Sheet Y: A sheet Y had an overall thickness of 1800 micrometers and had a non-woven fabric on the main surface of the film, and water-swellable urethane as a water retention material was dotted on the non-woven fabric. The water transport distance of the sheet Y was less than 50 mm according to the water transport distance test described in the present disclosure. The sheet Y which was cut to 120 mm vertically and 500 mm horizontally was used.

Mortar Plate

A mortar plate which was 120 mm long×70 mm wide×10 mm thick available from Nippon Tact Co., Ltd. (Ota-ku, Tokyo) was used. Before the test, the mortar plate was heated and dried for 7 hours or more in an oven set to 90° C. The mass of the mortar plate after drying (g) was recorded as the initial mass (g).

Working Example 1

Figure 13:
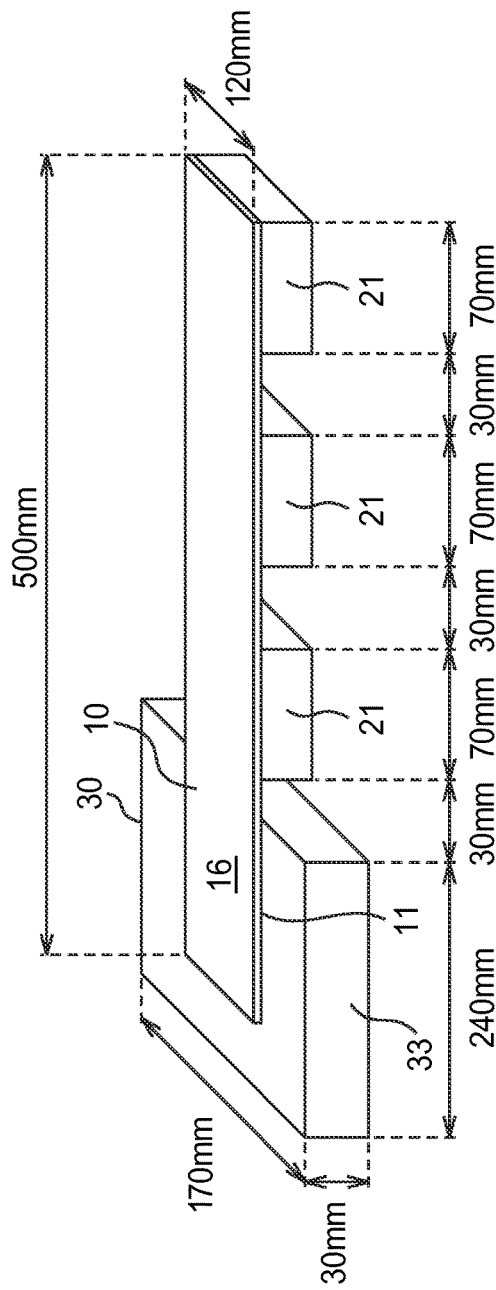
FIG. 13 is a schematic diagram for illustrating an arrangement of a container, a mortar, and a concrete curing sheet in working examples and comparative examples.

As shown in FIG. 13, a container which was 170 mm long×240 mm wide×30 mm thick was placed as the water supply source 30 on a metal mesh (not shown in the diagram) placed horizontally in a place where draining is possible, and three mortar plates 21 were aligned continuously with intervals of 30 mm therebetween in the longitudinal direction of the container. Mortars 1, 2, and 3 were labelled in order from the mortar closest to the container to those furthest away. 600 mL of the water 33 was filled in the container. After the concrete curing sheet X (number 10 in FIG. 13) was immersed in the container for 5 minutes, the sheet X was placed on the mortars 1 to 3 such that the first surface 11 of the sheet X as the concrete curing sheet 10 faced (contacted) the upper surfaces of the mortars 1 to 3, one end of the sheet X was aligned to the end of the mortar 3, and the sheet X covered all of the upper surfaces of the mortars 1 to 3.

The other end of the sheet X was immersed in the water in the container and, using this time point as a reference, the mass of the mortar plates (g) was measured at predetermined time intervals. The mass of the mortar plates (g1)—initial mass (g0) was recorded as the water supply amount (g3).

The test described above was performed in an atmosphere with a temperature of 23±3° C. From the start to the finish of the test, without adding water to the container, the water in the container was in a state of being opened to the surrounding atmosphere.

Working Example 2 and Comparative Examples 1 and 2

As illustrated in Table 1, the test was performed on Comparative Example 1 in the same manner as Working Example 1 except that the concrete curing sheet was changed to the sheet Y. Working Example 2 and Comparative Example 2 were conducted in the same manner as Working Example 1 and Comparative Example 1 except that the evaporation of the water from the container was suppressed. This was done by wrapping the opening of the container immediately after immersing the end of the sheet in the water, then performing the test. As shown in Table 1, the mortars were respectively labelled with numbers in order from the mortar close to the container.

TABLE 1

Test Conditions

| | Type of Sheet | Container | Mortar Label (from container side outward) |
|---|---|---|---|
| Working Example 1 | Sheet X | Open | 1 to 3 |
| Comparative Example 1 | Sheet Y | | 4 to 6 |
| Working Example 2 | Sheet X | Sealed | 7 to 9 |
| Comparative Example 2 | Sheet Y | | 10 to 12 |

The test results are shown in Tables 2 and 3 and in FIGS. 15 to 18.

TABLE 2

Evaluation of Water Supply Amount (Container Open)

| | | Water Supply Amount in Elapsed Time (h)/g | | | | | | |
|---|---|---|---|---|---|---|---|---|
| TIME | | 0 | 1 | 12 | 24 | 48 | 72 | 96 |
| Working Example 1 | Mortar 1 | 0 | 12.2 | 12.4 | 12.2 | 12.8 | 12.7 | 12.6 |
| | Mortar 2 | 0 | 12.1 | 12.4 | 12.7 | 13.1 | 13.0 | 13.2 |
| | Mortar 3 | 0 | 11.6 | 12.1 | 12.4 | 12.1 | 12.2 | 13.0 |
| Comparative Example 1 | Mortar 4 | 0 | 11.8 | 12.2 | 12.1 | 11.9 | 11.4 | 10.3 |
| | Mortar 5 | 0 | 11.7 | 12.2 | 12.5 | 12.4 | 10.4 | 9.2 |
| | Mortar 6 | 0 | 11.3 | 12.3 | 12.4 | 12.3 | 9.8 | 8.3 |

TABLE 3

Evaluation of Water Supply Amount (Container Sealed)

| | | Water Supply Amount in Elapsed Time (h)/g | | | | | | | | |
|---|---|---|---|---|---|---|---|---|---|---|
| TIME | | 0 | 1 | 12 | 24 | 48 | 72 | 96 | 120 | 144 |
| Working Example 2 | Mortar 7 | 0.0 | 12.6 | 12.6 | 12.9 | 11.9 | 12.6 | 12.1 | 12.8 | 11.8 |
| | Mortar 8 | 0.0 | 12.7 | 12.8 | 12.5 | 12.4 | 13.2 | 12.7 | 12.5 | 12.5 |
| | Mortar 9 | 0.0 | 13.0 | 12.5 | 13.0 | 12.8 | 13.2 | 12.7 | 12.8 | 12.6 |
| Comparative Example 2 | Mortar 10 | 0.0 | 12.5 | 12.5 | 12.3 | 12.4 | 12.6 | 11.5 | 10.2 | 8.4 |
| | Mortar 11 | 0.0 | 11.7 | 12.5 | 12.7 | 12.4 | 12.1 | 11.3 | 9.4 | 7.6 |
| | Mortar 12 | 0.0 | 11.3 | 12.7 | 12.4 | 12.1 | 11.3 | 10.3 | 8.4 | 7.4 |

Below, typical embodiments of the present disclosure will be listed.

(1) A concrete curing method including preparing a sheet having a solid structure group on at least a first surface, in which the solid structure group has grooves defined between adjacent solid structures, and the grooves transport water using the capillary phenomenon; and holding a state where the first surface of the sheet and the concrete surface face (are in close proximity or contact) each other and water is interposed between the first surface of the sheet and the concrete surface; and removing the sheet from the concrete surface after the holding continues for a predetermined time.

(2) The concrete curing method according to (1), in which the depth of the grooves is 1 to 3000 micrometers and the maximum width is 1 to 3000 micrometers.

(3) The concrete curing method according to either one of (1) or (2), in which the grooves are elongated in one direction.

(4) The concrete curing method according to any one of (1) to (3), in which water is attached to at least a part of the concrete surface, and the first surface of the sheet and the concrete surface face (are in close proximity or contact) each other.

(5) The concrete curing method according to any one of (1) to (3), in which water is attached to at least a part of the first surface of the sheet, and the first surface of the sheet and the concrete surface face (are in close proximity or contact) each other.

(6) A concrete curing sheet having a solid structure group on at least a first surface, in which the solid structure group has grooves defined between adjacent solid structures, and the grooves transport water using the capillary phenomenon.

(7) The concrete curing sheet according to (6), in which the depth of the grooves is 1 to 3000 micrometers and the maximum width is 1 to 3000 micrometers.

(8) The concrete curing sheet according to either one of (6) or (7), in which the grooves are elongated in one direction.

(9) The concrete curing sheet according to any one of (6) to (8), in which a base material is arranged on a second surface opposing the first surface.

(10) The concrete curing sheet according to any one of (6) to (9), in which a water supply inlet is provided in the first surface, the periphery thereof, or both.

(11) The concrete curing sheet according to any one of (6) to (10), in which the first surface is hydrophilic.

(12) A concrete curing system including the concrete curing sheet described in any one of (6) to (11), and a water supply source supplying water between the first surface of the concrete curing sheet and the concrete surface.

REFERENCE NUMERALS

10 Concrete curing sheet
11 First surface
12 Solid structure (first solid structure)
13 Groove (first groove)
13$a$ Groove opening section
13$b$ Groove deepest section
13$d$ Groove depth
13$w$ Groove maximum width
14 Second solid structure
15 Second groove
16 Second surface
17 Water supply inlet
18 Communication groove
20 Concrete
21 Mortar plate
30 Water supply source
31 Flow path
33 Water
40 Concrete curing system
A Groove shape A
L1 Reference plane
L2 Straight line parallel with reference plane
L3 Surface where solid structure is arranged

What is claimed is:

1. A concrete curing method comprising the steps of:
preparing a sheet having a solid structure group on at least a first surface, the solid structure group having grooves defined between adjacent solid structures, and the grooves transporting water using a capillary phenomenon;
holding a state where the first surface of the sheet and the concrete surface face each other and water is interposed between the first surface of the sheet and the concrete surface; and
removing the sheet from the concrete surface after the holding continues for a predetermined time.

2. The concrete curing method according to claim 1, further comprising the step of arranging a first member provided with at least one function selected from the group consisting of scattering-preventing properties, anti-skid properties, weather resistant properties, heat resistance, scratch resistant properties, thermal insulation properties, heat-shielding properties, heat dissipation properties, heat generating properties, light-shielding properties, and dust resistant properties on a second surface opposing the first surface of the sheet.

3. The concrete curing method according to claim 1, further comprising the step of arranging a second member provided with wettability or water retention properties on the first surface of the sheet or the concrete surface.

4. The concrete curing method according to claim 1, further comprising the step of sealing a peripheral edge portion of the sheet and the concrete surface or a peripheral edge portion of an adjacent sheet.

5. A method for producing concrete structures, the method comprising the steps of:
preparing a sheet having a solid structure group on at least a first surface, the solid structure group having grooves defined between adjacent solid structures, and the grooves transporting water using a capillary phenomenon;
holding a state where the first surface of the sheet and the concrete surface face each other and water is interposed between the first surface of the sheet and the concrete surface; and
forming cured concrete by removing the sheet from the concrete surface after the holding continues for a predetermined time.

* * * * *